No. 826,146. PATENTED JULY 17, 1906.
R. T. CRANE.
PIPE JOINT.
APPLICATION FILED AUG. 31, 1904.
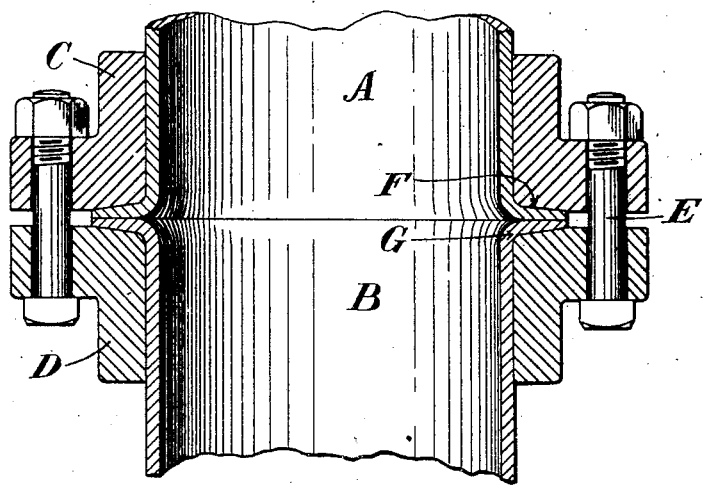

UNITED STATES PATENT OFFICE.

RICHARD T. CRANE, OF CHICAGO, ILLINOIS.

PIPE-JOINT.

No. 826,146.

Specification of Letters Patent.

Patented July 17, 1906.

Application filed August 31, 1904. Serial No. 222,842.

*To all whom it may concern:*

Be it known that I, RICHARD T. CRANE, a citizen of the United States, residing at Chicago, in the State of Illinois, have invented certain new and useful Improvements in Pipe-Joints, of which the following is a specification.

My invention relates to what are known as flange pipe connections and my primary object is the formation of such pipe connections in such a manner as to preserve so far as possible all of the strength of the iron of the pipe at the point where it turns over on the attaching flange.

Heretofore it has been customary to construct flange joints with metal attaching flanges having parallel radial faces. The flange being fitted over the end of the pipe and the metal of the end of the pipe being turned outwardly in the shape of a flange and bearing against the attaching flange along one of its parallel faces. It can be readily understood when the effect of this on the metal is considered, that when the ends of the pipe are turned over on the flanges in the manner specified, the iron of the pipe becomes very much thinner at its outer edge than it is at the beginning of the turned portion because of the increased periphery of the turned over part, and the thinning of the edge having given the end of the pipe a kind of inclined or rounded face, it is necessary in order to make a suitable joint to turn off the high portion of the pipe on the end so as to make it parallel to the radial face of the flange, and such turning reduces the thickest part of it to the thickness of the thinnest portion which very appreciably reduces the strength of the pipe at the joint where the strength is really most essential.

By examination of the accompanying drawing it will be seen that in overcoming the difficulties referred to I provide the attaching flanges C and D which are placed upon the pipe ends A and B with angularly disposed faces indicated at F, the angularity of such faces with reference to the radial plane of the pipe being just sufficient to compensate for the thinning of the end of the pipe as it is turned outwardly as above explained so that where the two ends of the pipes come together when the joint is assembled the meeting place itself will be in a radial plane and the metal will not need to be faced off so much and the pipe itself at the point marked D will retain substantially its full thickness and strength. When the parts are assembled they are of course held in place by means of the attaching bolts E.

This method of securing pipes together is of course not applicable to cast iron pipes, as the edges of such pipes could not be flanged over, but it is applicable only to commercial wrought or malleable pipes of either iron or steel which may be characterized by the generic term of ductile iron.

Having thus described my invention, what I claim as new, and desire to secure by Letters Patent, is—

1. In a pipe-joint the combination of a commercial ductile iron pipe having its ends flared over to approximately a right-angular position and an attaching flange having an inclined engaging face F to support the pipe, the inclination of said face being proportional to the thinning of the pipe metal due to the outward turning of the end of the pipe, and the front face of flare being machined at right angles to the axis of the pipe substantially as described.

2. A process of making a pipe joint which consists in flaring the end of a ductile iron pipe, thereby thinning the outer edge of the flare and leaving the rear side of the flare inclined, providing a flange having an inclined engaging face, the inclination thereof being proportional to the thinning in the flare, machining the front side of the flare and securing such flare and flange in contact.

In testimony whereof I have hereunder signed my name in the presence of the two subscribed witnesses.

RICHARD T. CRANE.

Witnesses:
PAUL CARPENTER,
ALBERT C. HOWARD.